United States Patent
Hayakawa

(10) Patent No.: US 11,822,214 B2
(45) Date of Patent: Nov. 21, 2023

(54) LENS APPARATUS AND IMAGING APPARATUS HAVING THE SAME

(71) Applicant: CANON KABUSHIKI KAISHA, Tokyo (JP)

(72) Inventor: Makoto Hayakawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/829,477

(22) Filed: Jun. 1, 2022

(65) Prior Publication Data
US 2022/0291571 A1    Sep. 15, 2022

Related U.S. Application Data

(63) Continuation of application No. 16/521,838, filed on Jul. 25, 2019, now Pat. No. 11,493,832.

(30) Foreign Application Priority Data

Aug. 7, 2018    (JP) .................. 2018-148655

(51) Int. Cl.
    *G03B 17/14*    (2021.01)
    *G02B 7/09*    (2021.01)
    *G03B 13/36*    (2021.01)

(52) U.S. Cl.
    CPC .............. *G03B 17/14* (2013.01); *G02B 7/09* (2013.01); *G03B 13/36* (2013.01)

(58) Field of Classification Search
    CPC .................. G03B 17/12–14; G02B 7/02–10
    See application file for complete search history.

(56) References Cited

U.S. PATENT DOCUMENTS

| 7,632,027 B2 * | 12/2009 | Noguchi ............... G03B 17/12 24/457 |
| 8,498,060 B2 | 7/2013 | Ito |
| 9,557,517 B2 | 1/2017 | Toyama |
| 11,493,832 B2 * | 11/2022 | Hayakawa ............... G02B 7/09 |
| 2017/0351050 A1 | 12/2017 | Sugita |

(Continued)

FOREIGN PATENT DOCUMENTS

| JP | H11258649 A | 9/1999 |
| JP | 2000338380 A | 12/2000 |
| JP | 2002318336 A | 10/2002 |

(Continued)

OTHER PUBLICATIONS

Office Action issued in U.S. Appl. No. 16/521,838 dated Mar. 2, 2022.

(Continued)

*Primary Examiner* — Leon W Rhodes, Jr.
(74) *Attorney, Agent, or Firm* — ROSSI, KIMMS & McDOWELL LLP

(57) ABSTRACT

A lens apparatus includes a first barrel configured to hold a first lens unit, a fixed barrel configured to hold a final lens unit, a focus lens unit driven by an actuator, and a positioning mechanism configured to determine positions of the first barrel and the fixed barrel in a rotational direction around an optical axis. The first barrel and the fixed barrel are directly connected, and the actuator and the focus lens unit are provided in a space formed by the first barrel and the fixed barrel.

15 Claims, 3 Drawing Sheets

(56) References Cited

U.S. PATENT DOCUMENTS

2020/0264404 A1    8/2020  Hanaoka

FOREIGN PATENT DOCUMENTS

| | | |
|---|---|---|
| JP | 2005326777 A | 11/2005 |
| JP | 2013050480 A | 3/2013 |
| JP | 2015215527 A | 12/2015 |
| WO | 2020003861 A1 | 1/2020 |

OTHER PUBLICATIONS

Office Action issued in Japanese Appln. No. 2018-148655 dated May 10, 2022. English translation provided.
Office Action issued in Japanese Application No. 2018-148655 dated Aug. 2, 2022. English translation provided.
Notice of Allowance issued in U.S. Appl. No. 16/521,838 dated Aug. 1, 2022.

* cited by examiner

LENS APPARATUS AND IMAGING APPARATUS HAVING THE SAME

BACKGROUND OF THE INVENTION

Field of the Invention

The present invention relates to a lens apparatus and an imaging apparatus having the same.

Description of the Related Art

Japanese Patent Laid-Open No. ("JP") 2000-338380 discloses a lens barrel in which a main structural member excluding a rear barrel and a bayonet portion is integrally molded in order to improve the strength.

The lens barrel of JP 2000-338380 screws a mechanism for moving the lens (focus mechanism) onto a holding barrel (main structural member) alone on the inner diameter side of the main structural member. In that case, the main structural member needs an end spread shape in which the diameter spreads from the attachment portion of the focus mechanism to the front side. Thus, the diameter of the main structural member becomes unnecessarily large, and the weight of the lens barrel increases.

The lens barrel disclosed in JP 2000-338380 initially screws the focus mechanism onto the main structural member, and then joins lenses L1 to L4 with the respective lens pressers. When the focus mechanism is to be disassembled due to a defect or dust or the like, the focus mechanism cannot be taken out until all the lenses L1 to L4 are disassembled and thus the disassembly performance is bad. It is inconvenient to fix the focus mechanism deep in the lens barrel for the assembly. One solution for this problem is to widen the opening of the main structural member on the front side, but the weight of the lens barrel increases.

SUMMARY OF THE INVENTION

The present invention provides a lens apparatus and an imaging apparatus having the same, which can improve the strength and reduce the weight.

A lens apparatus according to one aspect of the present invention includes a first barrel configured to hold a first lens unit, a fixed barrel configured to hold a final lens unit, a focus lens unit driven by an actuator, and a positioning mechanism configured to determine positions of the first barrel and the fixed barrel in a rotational direction around an optical axis. The first barrel and the fixed barrel are directly connected, and the actuator and the focus lens unit are provided in a space formed by the first barrel and the fixed barrel. An imaging apparatus having the lens apparatus also constitutes another aspect of the present invention.

Further features of the present invention will become apparent from the following description of exemplary embodiments with reference to the attached drawings.

DESCRIPTION OF THE EMBODIMENTS

Figure 1:
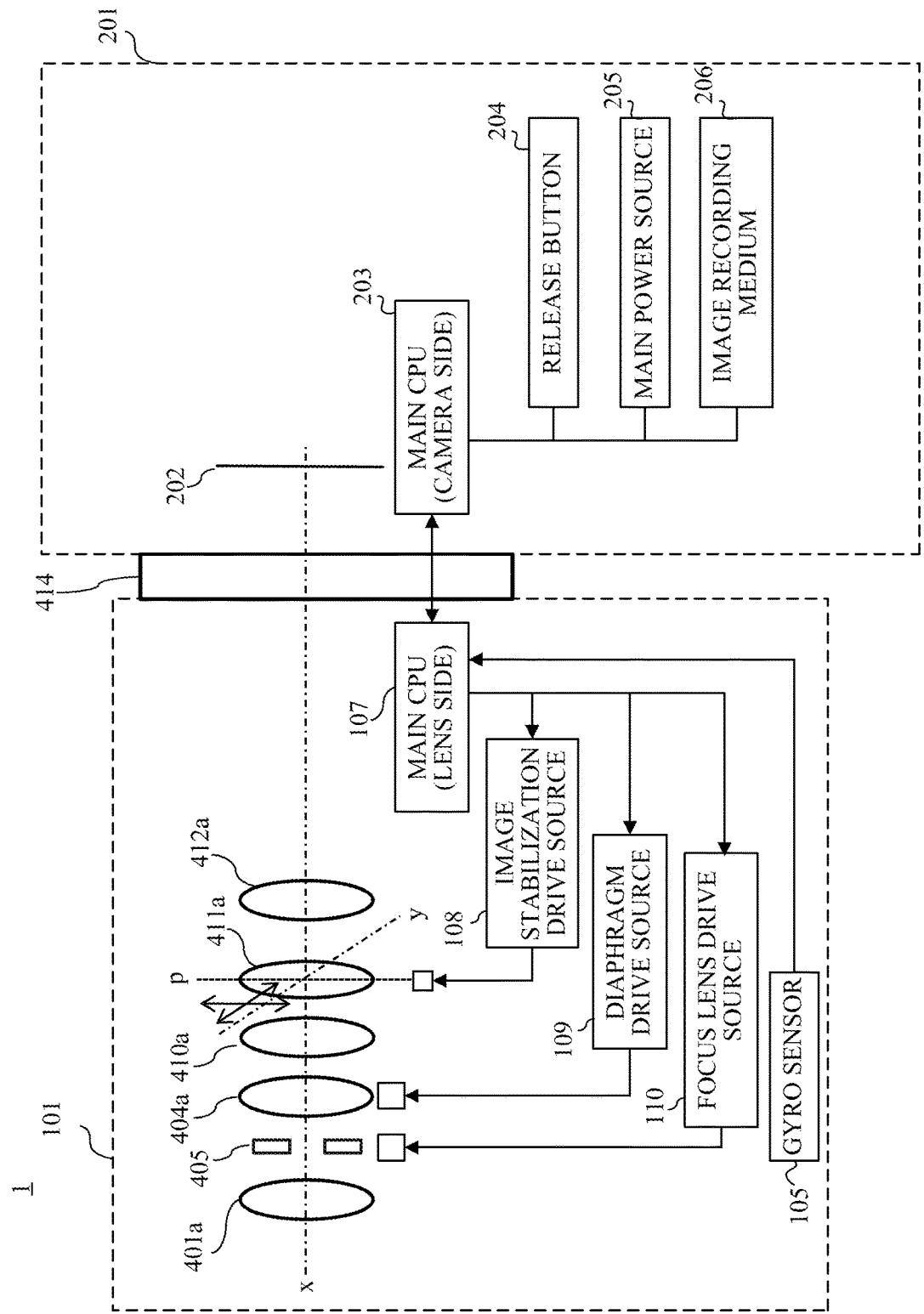
FIG. 1 is a block diagram of a camera system according to an embodiment of the present invention.

Referring now to the accompanying drawings, a description will be given of embodiments according to the present invention. Corresponding elements will be designated by the same reference numerals, and a duplicate description thereof will be omitted.

Referring now to FIG. 1, a description will be given of a configuration of a camera system 1 according to one embodiment of the present invention. FIG. 1 is a block diagram of a camera system 1. The camera system (imaging apparatus) 1 includes a lens barrel (lens apparatus) 101 and a camera body 201. The lens barrel 101 is fixed to the camera body 201 via a mount 414.

The lens barrel 101 includes a first lens (first lens unit) 401a, a diaphragm unit 405, a second lens (second lens unit, focus lens unit) 404a, a third lens (third lens unit) 410a, a fourth lens (fourth lens unit) 411a, and a fifth lens (fifth lens unit, final lens unit) 412a. Each lens is held by a barrel described later. The lens barrel 101 further includes a gyro sensor 106, a lens-side main CPU 107, an image stabilization drive source 108, a diaphragm drive source 109, and a focus lens drive source 110.

The lens-side main CPU 107 controls driving and calculates for the entire lens barrel 101. The lens-side main CPU 107 sends an instruction to the diaphragm drive source 109 to drive the second lens 404a. The lens-side main CPU 107 sends an instruction to the focus lens drive source 110 and drives the diaphragm unit 405.

In the image stabilization control, the lens-side main CPU 107 calculates a blur correction amount using a detection value of the gyro sensor 106 that detects a vibration, and sends an instruction to the image stabilization drive source 108. The image stabilization drive source 108 drives the fourth lens 411a in the y direction (yaw direction) and the p direction (pitch direction) orthogonal to the optical axis x based on an instruction from the lens main CPU 107, thereby providing an image stabilization.

The lens-side main CPU 107 further includes a determination unit that determines the holding state of the lens barrel 101 or the camera body 201 based on the detection value of the gyro sensor 106.

The camera body 201 includes an image sensor 202, a camera-side main CPU 203, a release button 204, a main power supply 205, and an image recording medium 206. The image sensor 202 photoelectrically converts an object image formed by the lens barrel 101 and outputs an electric signal. The release button 204 is an operation member having a two-stage pressing configuration: The first stage will be called SW1 and the second stage will be called SW2. The SW1 provides an instruction for the imaging start preparation, such as a return from the imaging standby, a start of the image stabilization, a start of the autofocus, and a start of the photometry. The SW2 provides an instruction for capturing an image and recording the image in the image recording medium 206. The camera-side main CPU 203 supplies the power to the lens barrel 101 and exchanges the information with the lens-side main CPU 107 via a contact block 415, which will be described later, provided on the mount 414.

Figure 2:
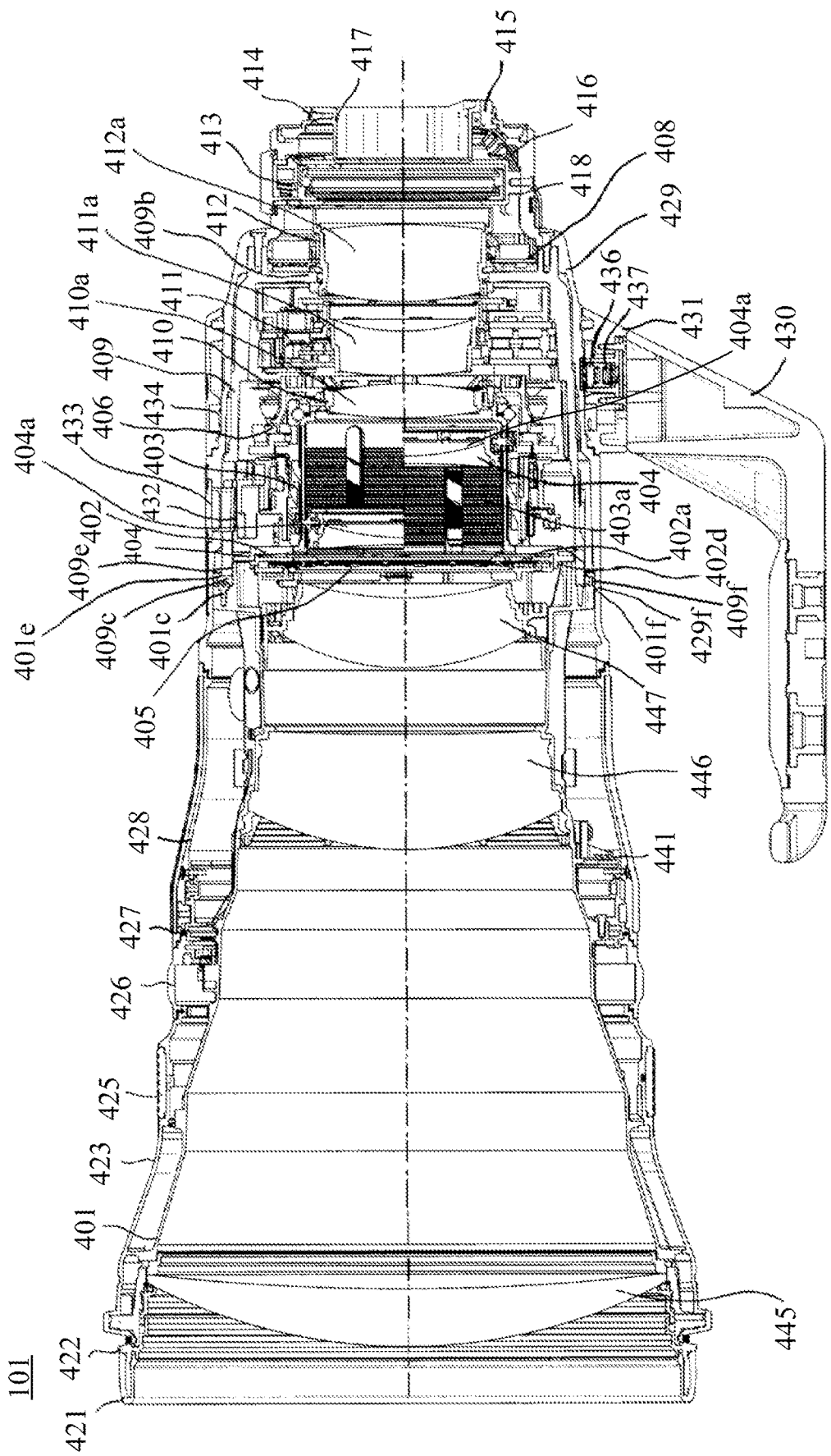
FIG. 2 is a sectional view of a lens barrel.
Figure 3:
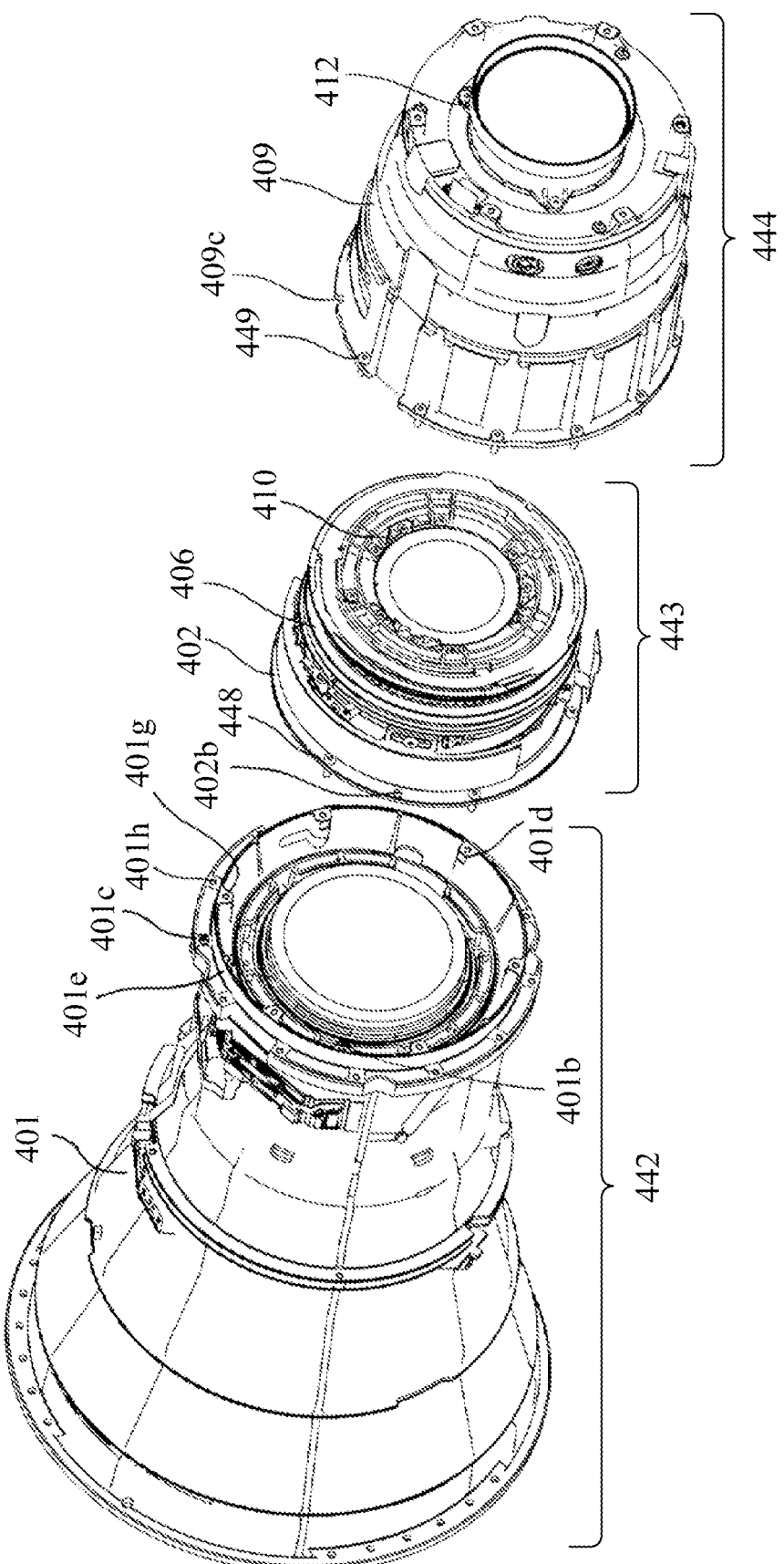
FIG. 3 is an exploded view of the lens barrel.

FIG. 2 is a sectional view of the lens barrel 101. In FIG. 2, the upper half of the central axis shows a second barrel (focus lens unit) 404 described later forms an image on the infinity side (image side). The lower half shows the second barrel 404 forms an image on the closest side (object side). FIG. 3 is an exploded view of the lens barrel 101 for each unit. In this embodiment, the lens barrel 101 is a long focus lens barrel.

The first barrel 401 holds the first lens 401a. The first lens 401a includes a 1a-th lens 445, a 1b-th lens 446, and a 1c-th lens 447. In other words, the lens held by the first barrel 401 corresponds to the first lens 401a. The first barrel 401 holds the lens provided closest to the object among the plurality of lenses provided in the lens barrel 101.

The 1a-th lens 445 and the 1b-th lens 446 are held by a press ring. The 1c-th lens 447 is held by another barrel, and is fixed onto the first barrel 401 by rollers. The first barrel 401 may be made of resin or metal, but the first barrel 401 in this embodiment is a metal barrel made of metal to maintain a high strength sufficient to hold the heavy first lens 401*a*. A first unit 442 includes the first barrel 401 and the first lens 401*a*.

The guiding barrel (holding barrel) 402 has a guide groove 402*a*. The cam ring 403 has a cam groove 403*a* and is rotatably held by the guiding barrel 402 at a fixed position. The second barrel (focus barrel) 404 holds the second lens 404*a* by heat caulking. The lens held by the second barrel 404 corresponds to the second lens 404*a*. The diaphragm unit 405 is fixed and held by the guiding barrel 402, and adjusts a light amount. The drive unit (actuator) 406 is fixed onto the guiding barrel 402 and performs rotational driving by the power control. The drive unit 406 includes an annular type piezoelectric actuator. The rotational driving force of the drive unit 406 is transmitted to the cam ring 403, and the cam ring 403 rotates around the optical axis. The second barrel 404 is engaged with the cam groove 403*a* and is linearly guided by the guide groove 402*a*, so that it can linearly move along the optical axis. The third barrel 410 holds the third lens 410*a* and is screwed and fixed onto the image-side end of the guiding barrel 402. The lens held by the third barrel 410 corresponds to the third lens 410*a*.

As described above, the cam ring 403, the second barrel 404, the diaphragm unit 405, the drive unit 406, and the third barrel 410 are fixed onto the guiding barrel 402. A guiding barrel unit 443 includes these components. In this embodiment, the diaphragm unit 405 is fixed onto the guiding barrel 402, but may be fixed into the first unit 442. In this embodiment, the drive unit 406 includes an annular piezoelectric actuator, but the present invention is not limited to this embodiment. The drive unit 406 may include a linear actuator.

The fixed barrel 409 is a metal barrel made of metal. The fourth unit (image stabilization unit) 411 holds the fourth lens 411*a* and is held inside the fixed barrel 409 by rollers. The lens held by the fourth unit 411 corresponds to the fourth lens 411*a*. The fifth lens barrel 412 holds the fifth lens 412*a* that is a final lens unit, and is fixed onto a fifth flange portion 409*b* of the fixed barrel 409. The lens held by the fifth lens barrel 412 corresponds to the fifth lens 412*a*. The fixed barrel 409 holds a fourth lens 411*a* and the fifth lens 412*a* which is the final lens unit. In other words, the fixed barrel 409 holds the final lens provided closest to the image among the plurality of lenses provided in the lens barrel 101.

As described above, the fourth unit 411 and the fifth barrel 412 are fixed onto the fixed barrel 409. The fixed barrel unit 444 includes these components. The fixed barrel 409 may be a lens barrel made of resin.

Next follows a description of a connection method of each unit in the assembly order. A description will now be given of a method of connecting the first unit 442 and the guiding barrel unit 443. A positioning pin 401*b* is attached to the first barrel 401. An engagement surface 401*d* is provided on the inner circumference of the first barrel 401. The guiding barrel 402 has a positioning hole 402*b*. An engagement surface 402*d* is provided on the outer circumference of the guiding barrel 402. When the engagement surface 401*d* is engaged with the engagement surface 402*d*, the positions of the first unit 442 and the guiding barrel unit 443 in the direction (eccentric direction) orthogonal to the optical axis are determined. When the positioning pin 401*b* is engaged with the positioning hole 402*b*, the positions of the first unit 442 and the guiding barrel unit 443 in the rotational direction around the optical axis are determined. When the screw 448 is fastened in a screw hole 401*g* provided in the first barrel 401 while the first unit 442 and the guiding barrel unit 443 are connected to each other, the first unit 442 and the guiding barrel unit 443 are connected to each other.

Next follows a description of a method of connecting the first unit 442 and the guiding barrel unit 443 in the connected state with the fixed barrel unit 444. A positioning pin 401*c* is attached to the first barrel 401. An engagement surface 401*e* is provided on the outer circumference of the first barrel 401. A positioning hole 409*c* is provided in the fixed barrel 409. An engagement surface 409*e* is provided on the inner circumference of the fixed barrel 409. When the engagement surface 401*e* is engaged with the engagement surface 409*e*, the positions of the first unit 442 and the fixed barrel unit 444 are determined in the direction orthogonal to the optical axis. When the positioning pin 401*c* is engaged with the positioning hole 409*c*, the positions of the first unit 442 and the fixed barrel unit 444 are determined in the rotational direction around the optical axis. In other words, the positioning pin 401*e* and the positioning hole 409*c* serve as a positioning mechanism that determines the positions of the first unit 442 and the fixed barrel unit 444 in the rotational direction around the optical axis. The first unit 442 and the fixed barrel unit 444 are connected to each other by engaging the screw 449 with the screw hole 401*h* provided in the first barrel 401 while the first unit 442 and the fixed barrel unit 444 are engaged with each other. Thus, the lens barrel 101 holding the optical system is completed.

A description will now be given of a component configuration on the appearance side. A rubber ring 421 is adhered to the tip of a protect ring 422 and screwed with the first barrel 401. A front exterior ring 423 is screwed with the first barrel 401. A cover rubber 425 covers an unillustrated function button 424 fixed onto a front exterior ring 423. An operation ring 426 is a functional switch. A press ring 427 is screwed into the first barrel 401 in the optical axis direction, and rotatably holds the operation ring 426. An electronic focus ring 428 is engaged with the circumferential groove provided in the press ring 427 by rollers and rotatably held by the press ring 427. A rotation detection sensor 441 detects a rotational amount of the electronic focus ring 428. The drive unit 406 is driven according to the rotational amount detected by the rotation detection sensor 441. Thereby, the second barrel 404 moves forward and backward along the optical axis for manual focusing.

A rear exterior ring 429 is screwed into the fixed barrel 409 on the image side of the fixed barrel 409 so as to cover the outer circumference of the fixed barrel 409. A filter holding frame 418 is fixed onto the rear exterior ring 429 and detachably holds an insertion filter unit 413. The mount 414 is fixed onto the rear end of the rear exterior ring 429 and fixes the contact block 415 for an electrical connection with the camera body 201. The contact block 415 is connected to a control substrate 408 through a lead wire 416. A light shielding barrel 417 is fixed onto the mount 414. A tripod ring 431 is rotatably held on the outer circumference of the rear exterior ring 429 and fixes the tripod seat 430. A distance scale window 433 is fixed onto the rear exterior ring 429, and used when the distance scale displayed on a distance scale ring 432 held by the drive unit 406 is confirmed from the outside. An bearing 434 is fixed onto the rear exterior ring 429 and rotatably holds the tripod ring 431. A click bearing 436 and a click spring 437 are disposed on the tripod ring 431 and generate a click feeling at a 90° pitch when the tripod ring 431 is rotated.

Next follows an effect of the present invention according to the above configuration. This embodiment uses the electronic focus ring 428 for manual focusing. Thus, the manual focusing can be performed without mechanically connecting the cam ring 403 and the electronic focus ring 428 to each other.

The conventional configuration that mechanically connects the cam ring 403 and the electronic focus ring 428 to each other requires the structure to pass inside the drive unit 406. More specifically, in order to connect the first barrel 401 and the fixed barrel 409, the connection between the fixed barrel 409 and the intermediate barrel, the connection between the intermediate barrel and the guiding barrel 402, and the connection between the guiding barrel 402 and the first barrel 401 are necessary. In other words, the structure includes four parts of the fixed barrel 409, the intermediate barrel, the guiding barrel 402, and the first barrel 401. If there are many parts between the front lens and the fifth lens 412a in fixing them, the accuracies of the parts themselves and assembling variations and deviations deteriorate, and the eccentricity and tilt between the front lens and the fifth lens 412a deteriorate. As a result, the optical performance deteriorates. In addition, the strength of the connecting portion of the structure needs to be sufficiently strong so that the connection can be maintained in response to an external force such as an impact. If there are many connecting portions, the strength guarantee is necessary at each connecting portion, and the reinforce clue is necessary by increasing the thickness. As a result, this scheme may increase the size and weight of the lens barrel 101. When the drive unit 406 is held on the outer circumference side of the guiding barrel 402, the diameter of the guiding barrel 402 is smaller than the diameter of each of the fixed barrel 409 and the first barrel 401. When the structure is connected at a portion with a small diameter, it is necessary to guarantee the connection by an engagement of a small diameter. Thus, it is necessary to increase the fastening force and to enhance the strength of the fastening portion in comparison with a case where the structure is received at a larger diameter. As a result, the weight of the lens barrel 101 may increase.

This embodiment does not need to mechanically connect the cam ring 403 and the electronic focus ring 428 to each other by using the electronic ring system as a manual focus method. Therefore, the first barrel 401 and the fixed barrel 409 can be directly connected to each other by completely enclosing the guiding barrel 402 and the drive unit 406 inside the fixed barrel 409. Thereby, three parts of the first barrel 401, the guiding barrel 402, and the fixed barrel 409 are located between the front lens and the fifth lens 412a in fixing them. The smaller number of components suppresses the accuracy deteriorations of the components themselves, the assembly variations and deviation, and thereby the deterioration of the eccentricity and tilt between the front lens and the fifth lens 412a. As a result, the good optical performance can be maintained. In addition, since the number of connecting portions of the structure is as small as one and the connection is provided at the outer circumference portion with a large diameter, it becomes easy to maintain the strength of the connecting portion, and the size and weight are smaller than those of the prior art configuration.

Thereby, the guiding barrel 402 and drive unit 406 can be provided in a space formed by the first barrel 401 and the fixed barrel 409, and the first barrel 401 and the fixed barrel 409 can be directly connected directly connected.

The connecting portion between the first barrel 401 and the fixed barrel 409 (position of the surface on which the screw hole 401h is provided) is provided on the object side of the position of the second lens 404a closest to the image side in the optical axis direction. In this embodiment, the connecting portion is closer to the object side than the position of the second lens 404a closest to the object side in the optical axis direction. When the connecting portion is closer to the image side of the position of the second lens 404a closest to the image side, the originally large first barrel 401 becomes larger, which makes manufacturing difficult and increases the cost. Since the first barrel 401 holds a heavy front lens at its tip, the moment applied to the connecting portion increases and it is necessary to increase the fastening force and strength of the fastening portion. Since this embodiment provides the connecting position on the object side of the position of the second barrel 404 closest to the image side, there is no need to increase the strength of the fastening portion unnecessarily, which can reduce the weight and cost. Since the lens barrel 101 is divided into the first unit 442, the guiding barrel unit 443, and the fixed barrel unit 444 at the optimum positions, each unit can be easily fastened and the assembly becomes easy.

In this embodiment, the first barrel 401 and the fixed barrel 409 are connected to each other after the position in the rotational direction around each optical axis is determined by the positioning pin. Similarly, the first barrel 401 and the guiding barrel 402 are also connected to each other after the position in the rotational direction around each optical axis is determined by the positioning pins. Thereby, the first unit 442, the guiding barrel unit 443, and the fixed barrel unit 444 are connected to one another after their positions are determined in the rotational direction around their respective optical axes. Therefore, as compared with a case where the respective units are screwed together, interference can be smoothly avoided when the position in the rotational direction around the optical axis deviates and a clearance for avoiding the interference becomes unnecessary. A smaller design is available by reducing the clearance among the components.

This embodiment directly fixes the guiding barrel unit 443 onto the first unit 442 rather than the fixed barrel unit 444. Thereby, the tilt and decentering can be improved between the first lens 401a and the second lens 404a, and the optical performance of this optical system can be maintained.

Moreover, this embodiment directly fixes the third barrel 410 onto the guiding barrel 402 rather than the fixed barrel 409. Thereby, the relative tilt and decentering can be improved between the third lens 410a and the second lens 404a, and the optical performance of this optical system can be maintained.

A main engagement surface 401f and a sub engagement surface 409f are provided on the outer circumference side of the connecting portion between the first barrel 401 and the fixed barrel 409. The diameter of the sub engagement surface 409f is slightly smaller than the diameter of the main engagement surface 401f. More specifically, the diameter of the sub engagement surface 409f is smaller than the diameter of the main engagement surface 401f by 0.1 mm. An engagement surface 429f is provided on the inner circumference surface of the rear exterior ring 429 provided on outside of the main engagement surface 401f and the sub engagement surface 409f. The radial distance between the main engagement surface 401f and the engagement surface 429f is smaller than the radial distance between the sub engagement surface 409f and the engagement surface 429f. With such a configuration, the engagement surface 429f and the main engagement surface 401f are engaged with each other, and the sub engagement surface 409f is slightly released. When an impact is applied to the lens from the outside, the engagement surface 429f supports the first barrel 401 with the main engagement surface 401f. This configuration can suppress a relative shift between the first barrel 401 and the fixed barrel 409 in the direction orthogonal to the optical axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148655, filed on Aug. 7, 2018, which is hereby incorporated by reference herein in its entirety.

What is claimed is:

1. A lens apparatus comprising:
   a first barrel configured to hold a first lens unit, which is provided closest to an object;
   a fixed barrel configured to hold a final lens unit, which is provided closest to an image;
   a focus lens unit driven by an actuator; and
   a holding barrel configured to hold the focus lens unit and the actuator,
   wherein the first barrel and the fixed barrel are directly connected,
   wherein the holding barrel is fixed in position relative to the first barrel, and
   wherein the holding barrel holding the actuator and the focus lens unit is provided in a space formed by the first barrel and the fixed barrel.

2. The lens apparatus according to claim 1, wherein the first barrel and the fixed barrel are fixed by a screw.

3. The lens apparatus according to claim 1, wherein a position where the first barrel and the fixed barrel are connected to each other is located on an object side of a position of the focus lens unit closest to an image side in an optical axis direction.

4. The lens apparatus according to claim 1, wherein a position where the first barrel and the fixed barrel are connected to each other is located on an object side of a position of the focus lens unit closest to an object side in an optical axis direction.

5. The lens apparatus according to claim 1, wherein the holding barrel is connected to the first barrel.

6. The lens apparatus according to claim 1, wherein the holding barrel holds a lens unit located on an image side of the focus lens unit.

7. The lens apparatus according to claim 1, wherein the holding barrel is a guiding barrel configured to linearly guide the focus lens unit, and to hold an annular piezoelectric actuator and a cam ring rotated by the annular piezoelectric actuator.

8. The lens apparatus according to claim 1, wherein the first barrel is a metal barrel.

9. The lens apparatus according to claim 1, wherein the fixed barrel is a metal barrel.

10. The lens apparatus according to claim 1, further comprising:
    an exterior barrel fixed to the fixed barrel so as to cover an outer circumference of the fixed barrel,
    wherein the exterior barrel is engaged with the first barrel at an outer circumference of a connecting portion between the first barrel and the fixed barrel.

11. The lens apparatus according to claim 10, wherein a radial distance between the first barrel and the exterior barrel is smaller than a radial distance between the fixed barrel and the exterior barrel.

12. The lens apparatus according to claim 1, further comprising a filter unit provided on an image side of the final lens unit.

13. The lens apparatus according to claim 1, wherein the first lens unit is fixed in an optical axis direction.

14. The lens apparatus according to claim 1, further comprising a positioning mechanism configured to determine positions of the first barrel and the fixed barrel in a rotational direction around an optical axis.

15. An imaging apparatus comprising:
    a lens apparatus; and
    an image sensor configured to photoelectrically convert an object image formed by the lens apparatus and to output an electric signal,
    wherein the lens apparatus includes:
       a first barrel configured to hold a first lens unit, which is provided closest to an object;
       a fixed barrel configured to hold a final lens unit, which is provided closest to an image;
       a focus lens unit driven by an actuator; and
       a holding barrel configured to hold the focus lens unit and the actuator,
       wherein the first barrel and the fixed barrel are directly connected,
       wherein the holding barrel is fixed in position relative to the first barrel, and
       wherein the holding barrel holding the actuator and the focus lens unit is provided in a space formed by the first barrel and the fixed barrel.

* * * * *